United States Patent Office

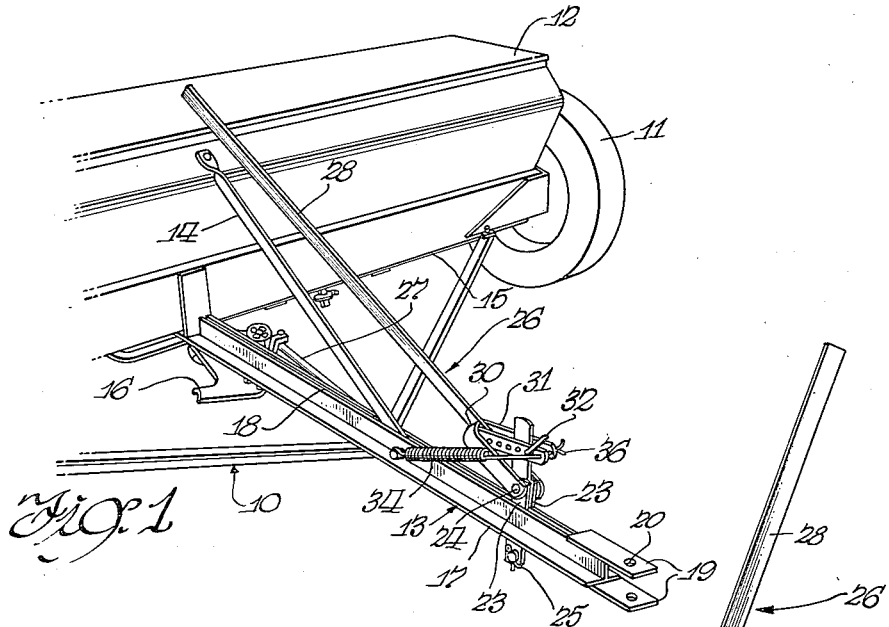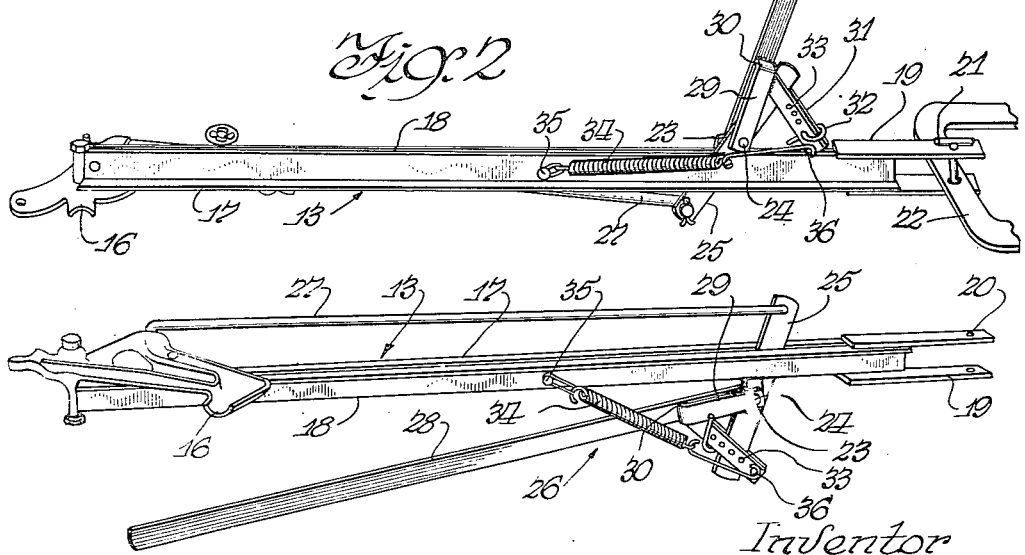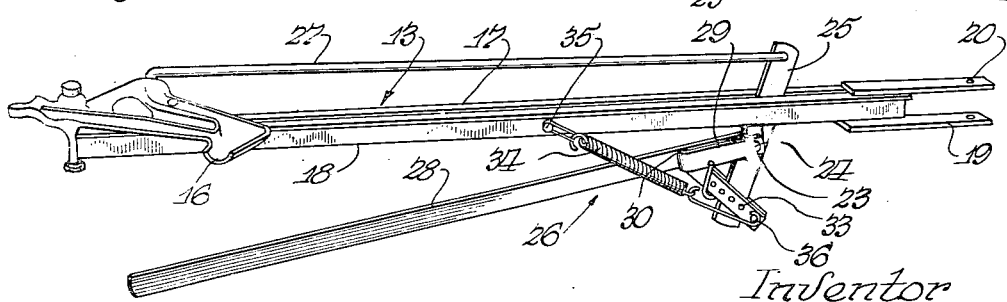

2,769,579
Patented Nov. 6, 1956

2,769,579

IMPLEMENT ADJUSTING DEVICE

David M. Morris, Richmond, Ind., assignor to International Harvester Company, a corporation of New Jersey Application March 30, 1954, Serial No. 419,782

12 Claims. (Cl. 222—176)

This invention relates to control apparatus for agricultural material dispensers, and more particularly concerns novel control mechanism for distributors of seed, fertilizer and the like.

The invention is described herein in its application to a fertilizer distributor of the trail-behind type. A machine of this type comprises generally a wheel supported frame extending transversely of the direction of travel, and a hitch frame by which the implement is connected to a tractor or other propelling force. An elongated transversely extending hopper is mounted on the frame and extends upwardly therefrom.

The dispensing apparatus, per se, of a machine of this type forms no part of this invention. For constructional details of a hopper of this type, reference may be had to copending application Serial No. 367,243, filed July 10, 1953. The hopper is provided with a plurality of openings in the bottom through which fertilizer or other material is discharged. A movable plate covering the bottom of the hopper is provided with registering openings, and movement of the plate adjusts the size of the discharge opening by covering part of the opening in the hopper bottom, or it closes the opening entirely. The regulation of the discharge of fertilizer is generally under the control of the operator of the tractor or other vehicle and is usually accomplished by means of an elongated lever mounted on the hitch frame near the tractor and extending vertically upwardly to be grasped by the operator and moved backward and forward about a pivot on the hitch frame, linkage being provided to connect the lever and the actuating mechanism for the adjustable bottom plate. It happens particularly with fertilizer distributors that residues are difficult of removal when it is desired to clean the hopper. For ease of access the entire machine is turned over so that it rests upon the top of the hopper. In these circumstances the adjusting lever referred to becomes a handicap in that it unbalances the machine or tilts it to an undesired angle.

A serious difficulty encountered with the conventional hand lever controls for feed openings also results from the tendency of the lever to creep, under severe vibration conditions encountered in operation, from an open position of the feed discharge mechanism to a closed position thereof.

The principal object of the present invention is, therefore, the provision of an improved regulating apparatus for controlling the feed openings in a fertilizer distributor and the like, wherein means are provided to offset the effects of vibration occurring during operation.

Another object of the invention is the provision of an improved control apparatus or regulating mechanism for the hopper discharge openings, which is accessible to the tractor operator but at the same time does not handicap the operator when he wishes to overturn the implement for cleaning purposes.

Another object of the invention is the provision of a machine of the type described having elongated adjusting apparatus accessible to the operator of the propelling vehicle wherein means are provided by which the adjusting lever may be moved to a position approaching parallelism with the hitch frame of the implement to avoid the difficulties incident to overturning the machine for cleaning, and the like.

Other objects and advantages of the invention will become clear from the following detailed description when read in conjunction with the accompanying drawings, wherein:

Fig. 1 is a perspective view of a portion of a fertilizer distributor having feed regulating apparatus incorporated therewith embodying the features of this invention.

Fig. 2 is an enlarged perspective view of the regulating apparatus in another operating position thereof mounted upon a hitch frame, the hopper and its supporting wheels not being shown.

Fig. 3 is a perspective view similar to Fig. 2 showing the position of the parts when the implement has been overturned for cleaning, repairing, and the like.

Referring to the drawings it will be observed that the fertilizer distributor with which this invention is concerned comprises a frame 10 supported by laterally spaced wheels 11, only one of which is shown, and carrying a transversely extending elongated fertilizer hopper 12. The machine is provided with a forwardly extending hitch frame 13 connected at its rear end to the hopper and braced by a diagonal strap 14.

The construction of the hopper and its discharge openings as well as the regulating bottom plate therefor may be of more or less conventional construction, although for a particular construction reference may be had to the copending U. S. patent application above referred to. Generally it may be noted that the bottom plate is designated by the numeral 15, and is movable longitudinally of the hopper to regulate the size of the discharge openings, through the intermediary of an actuating member 16 mounted on the hitch frame 13 adjacent the hopper and suitably connected to the bottom plate by linkage, not shown.

The hitch frame is T-shaped and consists of a pair of angle bars provided with bottom flanges 17 and a pair of closely spaced upwardly projecting flanges 18. A pair of vertically spaced plates 19 are welded to the forward end of the hitch frame 13 and are provided with registering openings 20 adapted to receive a hitch pin 21 by which the machine may be connected to the drawbar 22 of a tractor.

Means accessible to the tractor operator from his seat thereon for transmitting motion to the actuating member 16 is provided by control apparatus now to be described. A pair of laterally spaced lugs 23 are welded to and project upwardly from the upstanding flanges 18 of the hitch frame. These lugs provide supports for a transverse pivot pin 24 upon which, extending downwardly between the lugs 23 and the flanges 18 of the hitch frame, is mounted a rocker in the form of the short lower section 25 of a two-part adjusting lever generally designated at 26. Part of the lower lever section 25 extends downwardly from the hitch frame and is connected by a link 27 with the actuator 16. The actuator 16 is preferably in the form of a crank member which may be rocked in opposite directions to move the bottom plate in opposite directions for adjusting the discharge openings between open and closed positions.

The upper lever section is an elongated lever part 28, the upper end of which extends to a position within reach of the vehicle operator, and the lower end of which is bifurcated by the provision of an offset leg 29 connected to the main part of the lever so as to form an abutting shoulder 30 which serves as a stop, as will hereinafter appear. The lower end of the upper lever section 28 is also mounted upon the pivot pin 24 so that it rocks upon the same axis as the lower lever section 25.

In the position of the parts shown in Fig. 2 the lever 26 has been swung forwardly, and in the machine described this happens to be the closed position for the hopper discharge openings. In this position the upper section 28 of the lever has engaged, with the abutment 30, the rear upper edge of the lower lever section or rocker 25 so that the two lever parts rock as one. An arm 31 comprising laterally spaced lugs is welded to the lower part of the upper lever section 28 and extends forwardly and downwardly therefrom as indicated clearly in Fig. 2. The spaced members of this arm 31 confine the upper end of the lower lever section 25 and guide it in the relative movement of the parts, the space provided between the lugs of arm 31 and between shoulder 30 and pin 32 serving as a slot permitting lost motion between the rocker 25 and lever section 28.

Movement of the upper lever section 28 relative to the lower section 25 is limited in the confines of the arm members 31 by the stop shoulder 30 at one end and a stop pin 32 having a transverse portion receivable in any of several pairs of registering openings 33 in the arm 31. In the position of the parts shown in Fig. 2 the upper lever section 28 is biased against the lower lever section 25 by a spring 34 anchored at 35 to the hitch frame at one end, and at its other end to a cotter key or the like 36. The parts are so arranged that in this position the line of force of the spring 34, that is, a line drawn through the anchor point 35 and the cotter key 36, is below the axis of the pivot pin 24 so that the spring urges the upper lever section forwardly against the lower lever section.

As previously pointed out, one of the principal disadvantages of the prior one-piece lever constructions has been that during operation, with the feed openings in the hopper bottom in open position, vibration causes the lever to creep forwardly and gradually close the feed openings. In the position of the parts, such as indicated in Fig. 1 where the feed is open, the line of force of the spring 34 has moved above the axis of the pin 24 so that the upper lever section 28 is swung rearwardly of the lower lever section 25, and the latter abuts the pin 32. In this position of the parts vibration cannot cause the lever 26 to move forwardly to close the feed openings.

When the implement is to be overturned for cleaning, the pin 32 may be removed and placed in one of the rearward openings in the lugs 31 so that the lever part 28 may rock rearwardly the maximum extent to a position such as is indicated in Fig. 3, approaching parallelism with the hitch frame 13. In this position of the parts the lever section 28 is out of the way and does not interfere with the proper positioning and balance of the distributor during removal of the bottom plate and cleaning the residue from the hopper.

From the foregoing description it should be clear that a regulating lever apparatus for a fertilizer distributor or the like having novel characteristics has been devised. It should be noted that the operator of the propelling vehicle may utilize the lost motion provided by the spacing between the stops represented by the shoulder 30 and the pin 32 in the manner described, or he may render the two lever sections represented by the rocker 25 and the elongated hand-operated section 28, rigid and operative as a unit, by placing the pin 32 in the rearmost opening 33 in the lugs 31, bearing against the forward edge of the rocker 25.

While the invention has been described in its preferred embodiment it should be understood that modifications may be made therein without departing from the spirit of the invention or the scope of the appended claims.

What is claimed is:

1. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, a rocker pivotally mounted on the hitch frame operatively connected to said actuating member for operating the latter upon rocking the rocker, an elongated lever pivotally mounted on said hitch frame for swinging in the same direction as and relative to the rocker, abutment means on the lever engageable with the rocker in one direction of movement of the lever, and means providing lost motion connecting the lever to said rocker to limit the relative movement of the lever in the other direction.

2. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, a rocker pivotally mounted on the hitch frame operatively connected to said actuating member for operating the latter upon rocking the rocker, an elongated lever pivotally mounted on said hitch frame for swinging in the same direction as and relative to the rocker, abutment means on the lever engageable with the rocker in one direction of movement of the lever, and means serving as a slotted guide carried by the lever arranged to slidably receive said rocker and providing lost motion accommodating relative movement of the lever and rocker.

3. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, a rocker pivotally mounted on the hitch frame operatively connected to said actuating member for operating the latter upon rocking the rocker, an elongated lever pivotally mounted on said hitch frame for swinging in the same direction as and relative to the rocker, abutment means on the lever engageable with the rocker in one direction of movement of the lever, means serving as a slotted guide carried by the lever to slidably receive said rocker and having abutments at each end to engage the lever after predetermined swinging thereof relative to the rocker, and means for adjusting at least one of said abutments to vary the extent of relative movement of the lever and rocker.

4. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, a rocker pivotally mounted on the hitch frame operatively connected to said actuating member for operating the latter upon rocking the rocker, an elongated lever pivotally mounted on said hitch frame for swinging in the same direction and relative to the rocker, abutment means on the lever engageable with the rocker in one direction of movement of the lever, means serving as a slotted guide carried by the lever to slidably receive said rocker and having abutments at each end to engage the lever after predetermined swinging thereof relative to the rocker between two operating positions, and a spring connected to the hitch frame and to said lever and effective in either position of the lever to hold it against the respective of said abutments.

5. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, means serving as a pivot pin on the hitch frame near the tractor, and an operating lever mounted on the pivot pin for rocking on a transverse axis, said lever comprising a relatively short lower lever part mounted on said pivot pin and operatively connected to said actuating member for operating the latter upon rocking the lower lever part, an elongated upper lever part mounted on said pin extending upwardly therefrom, and an arm affixed to said latter lever part said arm having spaced apart portions to receive and confine the lower lever part therebetween, the upper lever part engaging the lower lever part to rock the latter in one direction, and a stop carried by said arm engageable with the lower lever part upon rocking the upper lever part in the other direction, the spacing between the upper lever part and said stop providing sufficient lost motion to accommodate swinging the upper lever part to a position approaching parallelism with the hitch frame.

6. In agricultural distributors and the like having a supporting frame including a hitch frame for connection to a tractive vehicle, and a hopper extending upwardly from the frame having discharge openings therein and closure means for regulating the flow of material, an actuating member associated with the hopper for operating the closure means, means serving as a pivot pin on the hitch frame near the tractor, and an operating lever mounted on the pivot pin for rocking on a transverse axis, said lever comprising a relatively short lower lever part mounted on said pivot pin and operatively connected to said actuating member for operating the latter upon rocking the lower lever part, an elongated upper lever part mounted on said pin extending upwardly therefrom, and an arm affixed to said latter lever part said arm having spaced apart portions to receive and confine the lower lever part therebetween, the upper lever part engaging the lower lever part to rock the latter in one direction, a stop carried by said arm engageable with the lower lever part upon rocking the upper lever part in the other direction, the spacing between the upper lever part and said stop providing sufficient lost motion to accommodate swinging the upper lever part to a position approaching parallelism with the hitch frame, and a spring connected to the hitch frame and to said arm, a line between the connecting points of said spring being movable to opposite sides of the axis of said pivot pin to bias the upper lever part in corresponding directions.

7. The invention set forth in claim 5, wherein said stop is adjustable to vary the range of movement of the upper lever part relative to the lower lever part.

8. The invention set forth in claim 5, wherein the lower end of the upper lever part is bifurcated for mounting upon the pivot pin and to provide an abutment for engagement with the lower lever part.

9. The invention set forth in claim 5, wherein the spaced apart portions of said arm are provided with a plurality of registering openings, and said stop is a removable pin insertable in said openings to adjust the relative movement of said lever parts.

10. In agricultural material distributors and the like having a transverse wheeled frame including a forwardly extending hitch frame for connection to a tractor and a hopper, means for regulating the flow of material from the hopper comprising an actuating member on the hopper, means serving as a pivot pin mounted on the hitch frame, a rocker member mounted on said pivot pin for rocking movement on a transverse axis operatively connected to said actuating member to regulate the flow of material, and projecting upwardly from said hitch frame, a lever mounted on said pivot pin and having a part engageable with said rocker to rock the latter upon movement of the lever in one direction, a pair of lugs affixed to the lever extending angularly therefrom to receive said rocker therebetween and having registering openings therein, a stop pin receivable in said openings and engageable with said rocker upon rocking of the lever in the other direction, and a spring anchored at one end to the hitch frame and at the other end to said lugs, the line of force of said spring being above the axis of said pivot pin to hold the stop pin against said rocker, and below said axis when the rocker engages said part on the lever.

11. The invention set forth in claim 10, wherein additional openings are provided in said lugs to receive said stop pin to vary the relative movement between the lever and said rocker.

12. The invention set forth in claim 10, wherein said stop pin is removable to accommodate pivoting of the lever to a position approaching parallelism with the hitch frame.

References Cited in the file of this patent

UNITED STATES PATENTS

| | | |
|---|---|---|
| 1,937,232 | Kuehling | Nov. 28, 1933 |
| 2,563,165 | Gandrud | Aug. 7, 1951 |
| 2,618,405 | Morris | Nov. 18, 1952 |